United States Patent [19]

Mashimo et al.

[11] 4,279,490
[45] Jul. 21, 1981

[54] ELECTRIC DRIVING DEVICE

[75] Inventors: Yukio Mashimo, Kawasaki; Tomonori Iwashita, Fuchu; Hidehiko Fukahori, Yokohama, all of Japan

[73] Assignee: Canon Kabushiki Kaisha, Tokyo, Japan

[21] Appl. No.: 82,461

[22] Filed: Oct. 9, 1979

[30] Foreign Application Priority Data

Oct. 11, 1978 [JP] Japan ................. 53-125472

[51] Int. Cl.³ ............................. G03B 1/00
[52] U.S. Cl. ................... 354/173; 354/214; 318/282; 318/293; 318/261
[58] Field of Search ............... 354/170, 171, 173, 212, 354/214; 352/121, 137, 169, 124; 318/282, 284, 291, 293, 261; 242/71, 71.4, 71.5, 71.6

[56] References Cited

U.S. PATENT DOCUMENTS

| | | | |
|---|---|---|---|
| 3,219,899 | 11/1965 | Kasper | 318/291 |
| 3,471,103 | 10/1969 | Gabor | 318/293 X |
| 3,731,170 | 5/1973 | Emmert | 318/293 X |
| 4,176,936 | 12/1979 | Kozuki et al. | 354/173 X |

Primary Examiner—L. T. Hix
Assistant Examiner—W. J. Brady

[57] ABSTRACT

In the disclosed device, forward and reverse rotation of a motor is used to wind and rewind a camera. A first semi-conductor switching element becomes conductive during winding and a second semi-conductor switching element becomes conductive during rewinding, the switching elements being connected in series across a power source. A selector switch has its fixed terminals connected to opposite poles of the power source. The motor is connected between the armature of the selector switch and the point between the switching elements. Driving circuits operate the switches so that the motor is driven in one direction when the selector switch is in one position and the reverse direction when the selector switch is in the other position and arranged to brake the motor after rewinding has stopped.

2 Claims, 2 Drawing Figures

ELECTRIC DRIVING DEVICE

BACKGROUND OF THE INVENTION

1. Field of the Invention

The present invention relates to a drive device for electrically winding and rewinding film in a camera.

Conventional film winding and rewinding devices use a one-way clutch to wind and rewind the film by respective forward and reverse rotation of a motor. Control of the normal and reverse rotation of the motor is accomplished by switching a selector switch between the terminals of the motor. This control method, however, requires a switch of a complicated structure with large size contact points to switch a relatively large current (about 1 amp.). For these reasons, the conventional art for controlling the motor rotations has many disadvantages of an electric driving device in a camera requiring a compact structure.

Therefore, an object of the present invention is to provide an electric driving device for a camera in which a semi-conductor switching circuit is combined with a simple switch to overcome the disadvantages of conventional electric driving devices.

According to a feature of the present invention, a drive circuit and a control circuit are provided for the winding operation and the driving circuit is used as a control circuit and the control circuit is used as a drive circuit for the rewinding operation, so as to perform the complicated control with a simple circuit structure.

In an electric drive device in which a high voltage power source is used directly for the rewinding operation so as to achieve high speeds, static electricity formed on the dry film surface may damage the latter.

Therefore, according to a feature the present invention, the rewinding speed is regulated by driving the device at a constant voltage lower than the power source during the rewinding operation so as to prevent the occurrence of static electricity on the film.

DETAILED DESCRIPTION OF THE INVENTION

Figure 1:
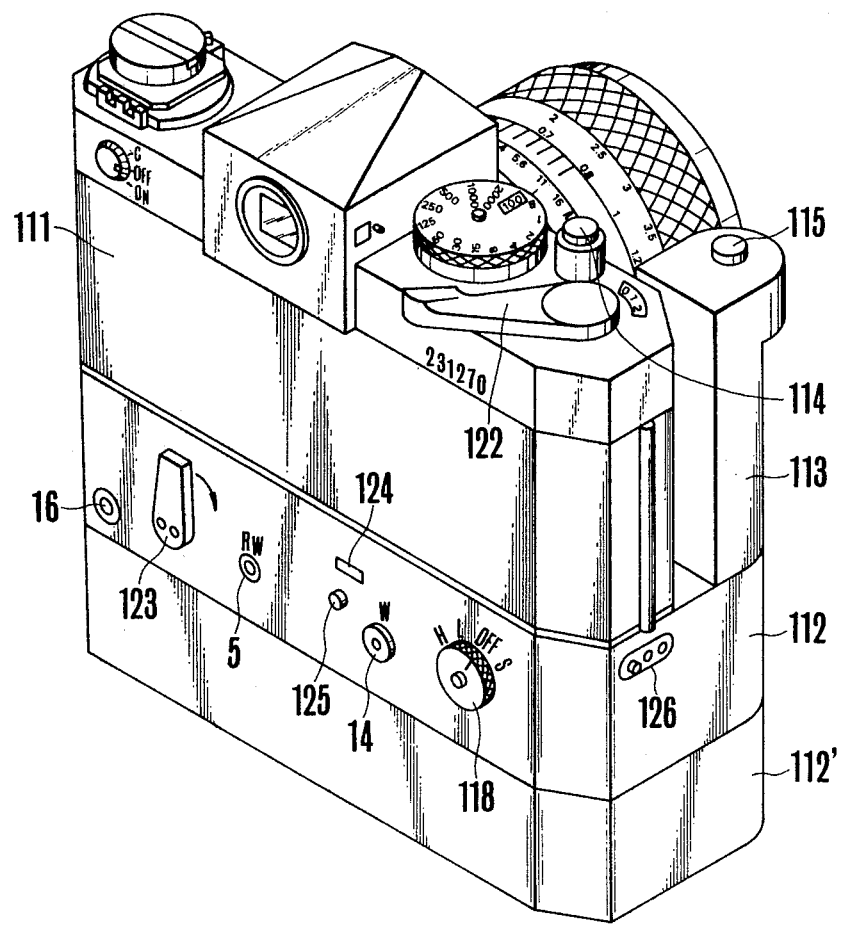
FIG. 1 is a perspective rear view of an electric driving device embodying the present invention, and attached to a camera body.

In FIG. 1, the electric driving device, drive device or drive 112 according to the present invention is attached to the body 112 of a single lens reflex camera. A grip 113 is fixed to the device 112. The system includes a release button 114 on the camera body 111 and a release button 115 on the driving device 112. The drive 112 includes a remote control terminal 116 and a mode selecting knob 118 which also serves as a main switch, luminant indicating diodes 5 and 14, a change over or selector member 123 for switching between the winding operation and the rewinding operation, a counter indication window 124, a pin or thumb 125 for setting the manual operation of the counter, a connection terminal 126 for a long film-incorporating chamber device, and a battery case 112′, all arranged as shown in the drawing.

Figure 2:
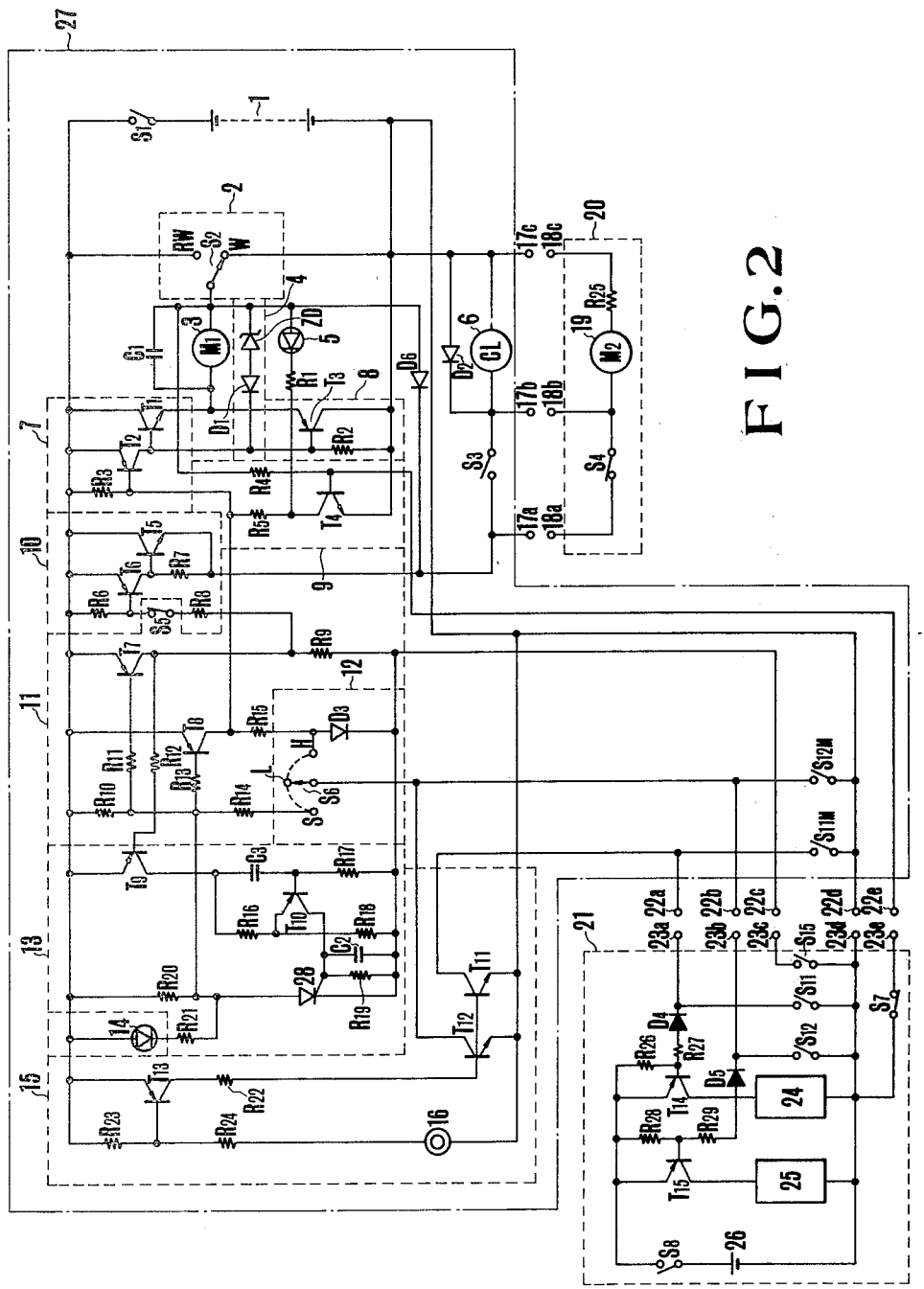
FIG. 2 is a schematic diagram of a control circuit in the drive device embodying features of the present invention.

FIG. 2 shows one embodiment of the circuitry in the drive system according to the present invention. A control circuit 20 defined by the dotted line is provided in an exchangeable film incorporating device. Chamber control circuit 21 is mounted in the camera body (111 in FIG. 1) and a control circuit 27 is mounted in the drive 112. The circuit 21 in the camera body and the circuit 27 in the drive are connected to each other by terminals 22a–22e and terminals 23a–23e, and the circuit 27 is connected to the circuit 20 in the film incorporating chamber device by terminals 17a–17c and terminals 18a–18c.

In the control circuit 21 in the camera body, a battery 26 (for example, 6 V) in the camera, is connected to a light measuring and indication circuit 24 and an exposure control circuit 25, through a main switch S8, and switching transistors T14 and T15.

In the control circuit 21, switches S11 and S12 are closed sequentially by the operator's pushing down the release button 114. The switch S11 is connected between the terminal 23a and the minus side of the battery 26, and the contact point of the switch S11 is connected to a switching transistor T14 through a reverse current preventing diode D4 and bias resistors R26 and R27. The switch S12 is connected between the terminal 23b and the minus side of the battery 26, and contact point of the switch S12 is connected to a switching transistor T15 through a reverse current preventing diode D5 and bias resistors R28 and R29. A switch S15 is connected between the terminal 23c and the minus side of the battery 26, and closes upon completion of an exposure operation and opens upon completion of the winding operation.

A switch S7 provided in the running path of the film is connected between the terminal 23e and the minus side of the battery 26, and closes when the film is charged in a feedable state and otherwise open, so as to detect the presence of the film.

In the control circuit 20 of the film incorporating chamber device, the minus side of a wind up driving motor m is connected to the terminal 18c through a resistor R25, and the plus side is connected to the terminal 18a through a switch S4 which opens on completion of the film transport. Also the motor 19 and the central point of the switch S4 are connected to the terminal 18b.

The control circuit 27 of the electric driving device 112 is energized by a battery (for example, 18V) through a main switch S1. The circuit 27 includes a selector or change over switch 2 which switches between winding and rewinding operations, a driving motor 3, an electromagnetic clutch 6, a motor driving circuit 7, a motor braking circuit 8, a rewind preventing circuit 9, a clutch drive circuit 10, a driving preventing circuit 11, a mode change over or switching circuit 12, a timer circuit 13 and a remote control circuit 15.

Switches S11M, S12M close one after the other in response to operation of the release button 115, the switch S11M being connected to the terminal 22a and the switch S12M being connected between the terminal 22b and 22d.

In the change over switch 2, a switch S2 is connected to the contact point, while the operation lever 123 of FIG. 1 is set to wind the film, and it is connected to the contact point RW while the lever is set to rewinding the film.

In the motor driving circuit 7 a transistor T1, connected in series to the motor 3, is turned on and off by a transistor T8 of the preventing circuit 11 through a transistor T2. The circuit 27 also includes resistors R3, R13, R14 and R15 and a capacitor C1.

In the motor braking circuit 8, a transistor T3, connected parallel to the motor 3, is turned on through the resistor R2 when the transistor T1 is off, and brakes the motor 3 in the winding state. The transistor T3 is connected to the selector switch 2 through a constant voltage circuit 4 composed of the reverse current preventing diode D1 and the constant voltage diode ZD and when the selector switch is set to rewind (RW), the transistor T3 drives the motor 3 at a constant voltage. A transistor T4 has its base connected to the film detecting switch S7 through a terminals 22e, 23e, and is connected to the selector switch 2 through the resistor R4. The collector of the transistor T4 is connected to the transistor T2 of the motor driving circuit 7 through the resistor R5 and also connected to the selector switch 2 through the diode 5 for indicating completion of rewinding.

In the clutch driving circuit 10, a transistor T5 is connected to the electromagnetic clutch 6 through the switch S3 and connected to the motor 19 for winding up the long film through the terminals 17a, 18a and the switch S4. The transistor T5 is turned on and off by the transistor T7 of the prohibition circuit 11 through the switch S5 associated with the film counter. Also the transistor T5 is connected to the selector switch 2 through the diode D6.

The circuit 27 also includes resistors and diodes D2 and D3. The switch S3 is always on and turns off when the incorporating chamber device 20 is mounted.

In the mode selector circuit 12, the change over switch S6 which changeable by the mode selcting knob can be moved between the fixed contact points, H, L and S.

In the timer circuit 13, a transistor T7 turns a switching transistor T9 on and off through a resistor R12. A capacitor C3 and a resistor R17 form a time constant circuit whose charge starting time is controlled by transistor T9.

A transistor T10 which is turned on and off by the voltage of the terminal at a capacitor C3, includes the collector connected to the gate of a silicon controlled rectifier SCR 28 as well as to a resistor R19 and a capacitor C2 both connected between the gate and cathode of the SCR. Two bleeding resistors R16 and R18 form a central point connected to the emitter of the transistor T10.

The anode of the SCR is connected to the bases of the transistors T7 and T8 through resistors R11 and R13, and also connected to the diode 14 for indicating the film and to a resistor R20. In the remote control circuit 15, a transistor T11 performs functions similar to the closing and opening of the switches S11 and S11M, and the transistor T12 performs functions similar to the closing and opening of the switches S12 and S12M. These transistors T11 and T12 are controlled by the transistor T13 through a resistor R22 and the base of the transistor T13 is connected to the remote control terminal 16 through a resistor R24 and a resistor R23.

When using the camera body without an exchangeable long film incorporating chamber device the device of FIG. 2 operates as follows.

The operation starts when the switch S15 is opened upon completion of the film winding in the camera. When the release button is pushed down, the switch S11 turns on and the switching transistor T14 turns on to actuate the light measurement indicating circuit 24 so that the light measurement computation is performed. Then when the release button is pushed down further, the switch S12 turns on and the switching transistor T15 goes on to actuate the exposure control circuit 25. In the latter the release magnet first actuates the internal mechanism of the camera. Then when the exposure ends, the switch S15 closes. The winding lever 122 winds the film and cocks the shutter. When this film winding operation ends, the switch S15 opens. The release operation is then again ready for the release button 114.

1. H-mode winding up operation

When drive 112 is mounted on the body 111, and the mode selection knob 118 (FIG. 1) of the driving device 112 is set to H (high speed continuous photography), the mode switch S6 is set to H with the camera body being in the wind up completion state, and the switch S2 is set to W to perform the H-mode winding up operation.

First the release button 115 is pushed down to close the switch S11M, thus allowing base current to flow to the switching transistor T14 through the terminals 22a, 23a. This turns the transistor T14 on and the light measuring indication circuit 24 operates the same way as when the camera body is used alone. When the release button 115 is pushed down further to close the switch S12M, base current flows to the switching transistor T15 through the terminals 22b, 23b. This turns on the transistor T15 which actuates the same release operation as if operating with just the camera body. Further, when the switch S12M closes, the transistor T2 is also turned on through the H contact point of the switch S6 and the resistor R15. This turns on the transistor T1 and rotates the motor 3. At this stage, however, because the electromagnetic clutch 6 is still off, the driving force of the motor 3 is not transmitted.

When the release of the camera is complete, the switch S15 in the camera circuit 21 closes and the transistors T6 and T5 turn on and energize the electromagnetic clutch 6. The latter transmits driving force of the motor 3 which winds (i.e. advances) the film and cocks the shutter. Then when the film is advanced one frame, the switch S15 opens, so that the transistors T6 and T5 turn off and terminate the clutch's transmission of the driving force of the motor 3. At this stage, if the release button is pushed down continuously, the camera shutter is released again, and by such repetition of the operation constitutes operation in the H-mode.

When the release button 115 is no longer depressed, the switch S12M opens and turns off the transistors T2, T1. However, during the course of a winding operation, where the switch S15 is on, the diode D3 holds the transistors T2, T1 on, and when the winding is complete and the switch S15 opens, the transistors T2, T1 for driving the motor turn off. When the transistors T2, T1 go off, the motor operates as a generator due to its inertia and a potential difference arises between the emitter and base of the transistor T3. This turns the transistor T3 on, thereby causing the short-circuiting and braking the motor 3.

2. L-mode winding operation

When the mode selecting knob 118 is set at L (low speed photographing) depressing the release button closes switch S11M and then the switch S12M, and the light measurement computation and the shutter release and performed just as in the H-mode. At this time, because the switch S6 is connected to the fixed contact point L, the transistors T2, T1 stay off even if the switch S12M closes. Then, when a shutter release has been completed, the switch S15 closes and the base current of the transistors T2 flows through the resistor R15, the diode D3, the terminals 22c and 23c and the switch S15 to bias on the transistor T2 and the transistor T1. This rotates the motor 3. Also the base current of the transistor T6 also flows through the switch S5, the resistors R8, R9, the terminals 22c and 23c and the switch S15, so that the transistors T6, T5 turn on and energize the electromagnetic clutch and the motor 3 simultaneously so they perform a winding operation. Then when the winding (i.e. film advance) operation has been completed, the switch S15 opens so that the transistors T2 and T6 turn off because the base current is cut off and the motor 3 and the electromagnetic clutch 6 stop operating. At this stage, the motor 3 is braked by the transistor T3 just as in the H-mode. If the release button 115 is pushed down continuously, the shutter release is repeatedly released in a continuous L-mode operation. When the shutter button is let go, the subsequent release operation is not effected even if the winding has been completed. In the L-mode, the motor 3 is actuated every time the winding operation is started so that the winding time is delayed by the rise time of the motor 3 and each photographic cycle is longer than that of the H-mode.

3. S-mode winding up operation

For single frame photographing, the mode selecting knob 118 is turned to the single frame position (S). When the release button 115 is now pushed down, the switch S11M and then the switch S12M are closed to effect the light measuring computation and the shutter release just as in the H-mode. Then when the shutter release is completed, the switch S15 closes. However, if the switch S12M is closed, the base current of the transistors T7 and T8 flow through the resistors R11, R13 and R14, the fixed contact S of the switch S6 and the switch S12M, so that the transistors T7 and T8 turn on. When the transistor T8 goes on, it short-circuits the emitter and base of the transistor T2, so that the latter remains off even if the switch S15 is already closed. The transistor T1 continues to remain off so that the motor does not rotate. When the transistor T7 goes on, it short-circuits the emitter and base of the transistor T6, so that the transistors T6 and T5 remain off and maintain the electromagnetic clutch off.

Then when the release button is let go, the switch S12M opens so that the transistors T7 and T8 go off turns the base current is cut off. When the transistor T8 becomes off, the transistors T2 and T1 turn on to rotate the motor 3. Also when the transistor T7 turns off, the transistors T6 and T5 go on to turn on the electromagnetic clutch 6 simultaneously with the motor 3 to effect a film advance. When the film advance operation is completed, the switch S15 opens so that the transistors T2 and T6. Hence, the motor 3 and the electromagnetic clutch go off. At this stage, the motor 3 is subjected to the braking action of the transistor T3 just as in the H-mode. The above operations produce single frame photography in the S-mode.

The counter switch S5 in the drive prohibiting circuit 11 is structured so that if a camera operator presets the number of the frame to be photographed in the counter 125, the number is indicated in the indication window 124 and the switch S5 is turned off when the preset number of frames is reached. When the switch S5 goes off, the electromagnetic clutch 6 remains off and does not perform the winding up operation, because the transistors T6 and T5 are off, even when photography has been completed and the switch S15 has turned on.

The time constant of the timer 13 determined by the resistor R7 and the capacitor C3 is normally set at a time (for example about 500 ms) longer than the ordinary winding time (for example 100 to 300 ms).

Simultaneously when the transistors T6 and T5 become on so as to start the winding operation, the transistor T9 becomes on through the resistor R12 and the capacitor starts to charging through the resistor R7 and the switch S15. If the winding up operation finishes within the ordinary winding up time, the switch S15 is turned on before the capacitor C3 completes charging so that the charge across the capacitor is cut off, and the electric charge is discharged through the resistors R16, R18 and R17.

If the winding operation does not finish within the normal winding up time, the switch S15 is not turned off even after the lapse of the set time (for example 500 ms) so that the capacitor C3 completes charging and the transistor T10 goes on. Then SCR28 turns on, and the transistor T8 is turned on through the resistor R13. This short-circuits the emitter and the base of the transistor T2 to turn off the transistors T2 and T1 and the motor is deenergized. Also when SCR28 turns on, the base current of the transistor T7 flows through the resistor R11 so that the transistor T7 goes on. Hence, the transistors T6 and T5 and the electromagnetic clutch 6 go off simultaneously with the motor 3 to cut off transmission of the driving force. Further, when SCR28 turns on, the diode 14 illuminates to indicate that the motor 3 and the electromagnetic clutch have been turned off by the timer circuit.

When the terminals 16 for the remote control 15 are short-circuited by an auxiliary unit (not shown), the base current of the transistor T13 flows through the terminals 16 and the transistor T13 turns on. When the transistor T13 turns on, the transistors T11 and T12 and attain the same state as when the switches S11 and S12 go on. Therefore, when the terminal 16 for the remote are short-circuited, the transistors T11 and T12 turn on to obtain the same state as when the switches S11 and S12 are turned on by pushing down the release button 114, thus enabling to drive the camera and the electric driving device.

With respect to the long film device 20, the electromagnetic clutch 6 in the electric winding up device 27 and the motor 19 in incorporating chamber device are connected in parallel through the terminals 17b, 18b and the terminals 17c and 18c. The switch S3 and the switch S4 are also connected in parallel through the terminals 17a and 18a and the terminals 17b and 18b.

The switch S3 is normally on, but when the incorporating chamber device is attached, it turns off. The switches S4 is provided in the running path of the film, and is on, while the film is in the running path, but it turns off when the film winding is completed.

When the photography is finished and the switch S15 as well as the transistors T6 and T5 turn on, the electromagnetic clutch 6 turns on through the terminals 17a and 18a, the switch S4 and the terminals 17b and 18b. Also the motor 19 is energized through the terminals 17a and 18a and the switch S4.

At this time, the transistors T2 and T1 also turn on and the motor 3 turns on so that the winding up operation is performed just as in the case of the short film.

With respect to the rewinding operation, if the counter switch S5 is turned off by the termination of the film, and that the transistors T6, T5, T2 and T1 are off due to the operation of the timer circuit, then the diode 14 lights when SCR28 goes on and indicates that the film is finished.

Under this circumstance, when the switch 2 is set to the RW contact point on the rewind side by the operation member 123. The electric current, reverse to that in the winding operation, flows to the motor 3 through the RW contact point of the switch 2 and the transistor T3. Hence, the motor rotates in a reverse direction to perform the rewinding operation i.e. rewind the film. At this time, the electromagnetic clutch 6 goes on through the diode D6. When the switch 2 is set to the RW contact point, one terminal of the diode ZD contacts with the plus side of the power source to maintain a constant voltage between the base of the transistor T3 and the plus side of the power source, so that the motor is driven at a constant voltage. When the tongue of the film leaves the spool in response to the electric rewinding operation, the switch S7 for detecting the presence of the film goes off. As the switch S7 connects between the emitter and the base of the transistor T4 through the terminals 22e and 23e and the terminals 22d and 23d, the transistor T4 remains off even if the current flows through the resistor R4 when the switch S7 turns on and the switch 2 set to the RW side. Also when the rewinding operation ends while the switch 2 is on the RW side and the switch S7 goes off. The current flows to the base of the transistor T4 through the resistor R4, so that the transistor T4 turns on to cause the transistor T2 to turn on through the resistor R5. As the result, the transistor T1 goes on, while the transistor T3 goes off. When the transistor T1 turns on, both terminals of are motor 3 is short-circuited through the RW contact point of the switch 2, so that when the switch S7 turns off, the motor 3 stops suddenly. Also when the transistor T4 turns on, the diode 5 lights through the resistor R1 to indicate that the rewinding operation is completed.

As understood from the forgoing descriptions of the embodiments, in the electric driving device according to the present invention, the winding operation and the rewinding operation are switched by one motor and for this purpose the winding drive circuit and the rewinding drive circuit are provided and either one of these circuits is used for effecting the braking action during stoppage of the device. Therefore, the present invention has the advantage that the winding operation and the rewinding operation are switched by a simple structure and circuitry, and a stable operation can be obtained without changing over of a small current so that the device can be small and light.

What is claimed is:

1. An electric driving device for performing winding and rewinding operations in a camera, which comprises:
    a first semi-conductor switching element which becomes conductive at the time of a winding operation:
    a second semi-conductor switching element which becomes conductive at the time of a rewinding operation;
    said first and second switching elements being connected to form a series circuit to be connected between both poles of a power source;
    a changeover switch having two fixed terminals to be connected to respective poles of the power source;
    a motor with one end connected to a central point of the series circuit with another end connected to a movable terminal of the changeover switch;
    first and a second motor driving circuits formed by the changeover switch and the first and second switching elements;
    said first driving circuit effecting normal rotation of the motor to perform the winding operation;
    said second driving circuit braking the motor at the time of stoppage of the winding operation, and effecting reverse rotation of the motor to perform the rewinding operation; and
    said first driving circuit being arranged for braking the motor at the time of stoppage of the rewinding operation.

2. An electric driving device according to claim 1, wherein the second driving circuit is actuated by a constant voltage power source when the device is changed over to the rewinding operation by the cooperation of the changeover switch and the semi-conductor switching elements.

* * * * *